United States Patent
Liang et al.

(10) Patent No.: US 10,008,195 B2
(45) Date of Patent: Jun. 26, 2018

(54) LIQUID RUBBER DAMPING COMPOSITION

(71) Applicant: Henkel AG & Co. KGaA, Duesseldorf (DE)

(72) Inventors: Jeng-Li Liang, Auburn Hills, MI (US); Michael S. Puckett, Rochester, MI (US); Gregory A. Ferguson, Harrison Township, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days. days.

(21) Appl. No.: 14/767,041

(22) PCT Filed: Feb. 7, 2014

(86) PCT No.: PCT/US2014/015316
§ 371 (c)(1),
(2) Date: Aug. 11, 2015

(87) PCT Pub. No.: WO2014/124269
PCT Pub. Date: Aug. 14, 2014

(65) Prior Publication Data
US 2016/0035339 A1     Feb. 4, 2016

Related U.S. Application Data

(60) Provisional application No. 61/763,088, filed on Feb. 11, 2013.

(51) Int. Cl.
| | |
|---|---|
| *G10K 11/162* | (2006.01) |
| *C08L 9/00* | (2006.01) |
| *C08K 5/13* | (2006.01) |
| *C08L 9/06* | (2006.01) |
| *C08L 15/00* | (2006.01) |
| *B05D 1/02* | (2006.01) |
| *B60R 13/08* | (2006.01) |

(52) U.S. Cl.
CPC .............. *G10K 11/162* (2013.01); *B05D 1/02* (2013.01); *B60R 13/08* (2013.01); *C08K 5/13* (2013.01); *C08L 9/00* (2013.01); *C08L 9/06* (2013.01); *C08L 15/00* (2013.01)

(58) Field of Classification Search
CPC ........ G10K 11/162; B60R 13/08; B05D 1/02; C08L 9/00; C08L 9/06; C08L 15/00; C08K 5/13
USPC ....... 524/323, 324, 342, 343, 349, 350, 351, 524/352, 353
See application file for complete search history.

(56) References Cited

U.S. PATENT DOCUMENTS

| | | |
|---|---|---|
| 5,741,824 A | 4/1998 | Butschbacher et al. |
| 6,096,791 A | 8/2000 | Born et al. |
| 6,277,903 B1 | 8/2001 | Sophiea et al. |
| 6,361,643 B2 | 3/2002 | Born et al. |
| 6,465,607 B2 | 10/2002 | Taguchi et al. |
| 6,531,541 B1 | 3/2003 | Desai et al. |
| 7,176,258 B2 | 2/2007 | Morihiro |
| 7,253,218 B2 | 8/2007 | Hussaini et al. |
| 8,137,500 B2 | 3/2012 | Sauer et al. |
| 2001/0044503 A1 | 11/2001 | Born et al. |
| 2004/0052951 A1 | 3/2004 | Sauer et al. |
| 2004/0082721 A1 | 4/2004 | Miura et al. |
| 2007/0299193 A1* | 12/2007 | Sauer ................ C08J 5/04 524/494 |
| 2008/0039564 A1 | 2/2008 | Desai et al. |
| 2010/0222449 A1* | 9/2010 | Noda ................ C08K 5/0025 522/99 |
| 2012/0021155 A1 | 1/2012 | Chen et al. |

OTHER PUBLICATIONS

International Search Report for International Application No. PCT/US2014/015316 dated Jun. 2, 2014.

* cited by examiner

*Primary Examiner* — Roberto Rabago
(74) *Attorney, Agent, or Firm* — Mary K. Cameron

(57) ABSTRACT

Sprayable low-viscosity compositions have improved acoustic damping properties through the addition to the composition of a sterically hindered phenol, present in an amount from 9% to 18% by weight of the composition. In other embodiments, the sterically hindered phenol will have a melting point within the range from 60° C. to 250° C. and a molecular weight of 300 g/mol or less (but not 0).

15 Claims, No Drawings

LIQUID RUBBER DAMPING COMPOSITION

BACKGROUND OF THE INVENTION

This invention relates to compositions based on natural and/or synthetic elastomers containing olefinic double bonds that have acoustic damping properties in the vulcanized state.

Manufacturers of vehicles, machines, and appliances use very thin-walled panels in fabrication to reduce the weight and size of the manufactured articles. Mechanically moving parts or operating motors inevitably cause these thin-walled panels to vibrate. The vibrations are propagated in the form of solid-borne sound throughout the vehicle, machine, or appliance, and can be radiated into the air at remote locations. To reduce that sound radiation these panels are typically equipped with sound-damping linings.

Vehicle manufacturers use various technologies for the damping of vibrations in vehicle body structures in order to reduce noise in the passenger compartment of the vehicles. A conventional solution is the use of asphalt damping pads, comprising mixtures of bitumen and fillers, manually installed and thermally bonded to the sheet metal composing the vehicle body structures. This is difficult, time-consuming, and labor-intensive, and can introduce dirt and contaminants into the vehicle body paint shop resulting in paint finish defects; moreover, the asphalt sheets are brittle and tend to split away from the panel at low temperatures.

Currently, thick film coatings prepared from other polymer systems are being designed and used to replace melt-on asphalt damping pads. Although these are improvements on the asphalt damping pads, they are not problem free. Water-based acrylic, polyvinyl acetate, and ethylene/vinyl acetate emulsions, containing fillers, have been developed and can be sprayed onto the sheet-metal parts at the required lining thickness. However, they have the disadvantages that the water, at sufficiently thick coatings, cannot be removed rapidly enough to process industrial volumes efficiently, and the coatings can crack and shrink resulting in less consistent damping performance.

Thick-film coatings using solid plastisol compositions at nearly 100% solid polymers have been used in attempts to eliminate volatile content. However, plastisol sound damping compounds are not reliably cross-linking and they become soft and lose stiffness at elevated temperatures. This causes the sound damping performance to be lower.

Epoxy-based compositions usually consist of flexible epoxy resins and rigid epoxy resins. The cost of flexible epoxy resins tends to be high, and the cost of curing also tends to be high. The curing of an epoxy coating with a latent crosslinker requires a minimum of 160° C. at automotive production line speed.

In an effort to reduce the complexity of vehicles, machines, and appliances, and thereby decrease manufacturing costs, sprayable low viscosity liquid polybutadiene sound damping compositions containing a sulfur vulcanization agent have been attempted that allow robotic application at precise locations at room temperature or at only slightly elevated temperature. However, there is still a need for compositions that give improved sound damping while avoiding the drawbacks described above.

SUMMARY OF THE INVENTION

This invention relates to sprayable low-viscosity compositions that have acoustic damping properties in the vulcanized state and that are based on natural and/or synthetic elastomers containing olefinic double bonds (rubbers). In particular, this invention is an improved acoustic damping composition comprising a liquid elastomer having olefinic double bonds, a vulcanization agent, a filler, and a sterically hindered phenolic compound. In various embodiments, the sterically hindered phenolic compound will be present in an amount from 5-25%, and in some embodiments, from 9% to 18% by weight of the composition. In other embodiments, the sterically hindered phenolic compound will have a melting point within the range from 60° C. to 250° C. In further embodiments, the sterically hindered phenolic compound will have a molecular weight of 300 g/mol or less (but not 0).

The invention further relates to methods of making and using sprayable low viscosity liquid polybutadiene sound damping compositions containing a sulfur vulcanization agent that allow robotic application at room temperature or at only slightly elevated temperature, comprising the compositions as described herein and articles of manufacture having a coating of a composition as described herein, said coating being in a vulcanized state.

It is an object of the invention to provide an acoustic damping composition comprising (A) at least one liquid elastomer, (B) a vulcanization agent, and (C) 9 to 18 wt % of a sterically hindered phenol having a melting point in a range from 60° C. to 250° C.

It is an object of the invention to provide an acoustic damping composition in which the sterically hindered phenol has a molecular weight of 300 g/mol or less, but not 0.

It is an object of the invention to provide an acoustic damping composition in which the at least one liquid elastomer is selected from the group consisting of polybutadienes, functionalized polybutadienes, and styrene butadiene copolymers.

It is an object of the invention to provide an acoustic damping in which the vulcanization agent is prepared from i) sulfur powder, ii) organic accelerator, and iii) metal oxide.

It is an object of the invention to provide an acoustic damping composition in which the sterically hindered phenol has a structure corresponding to Formula I:

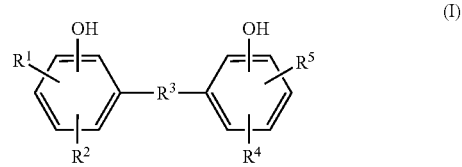

in which $R^1$, $R^2$, $R^4$, and $R^5$, independently of each other, are a $C_1$ to $C_{12}$ alkyl group, and $R^3$ is a hydrocarbon group or a thio group. It is a further object of the invention to provide an acoustic damping composition where $R^1$, $R^2$, $R^4$, and $R^5$ are independently selected from the group consisting of methyl, ethyl, n-butyl, tert-butyl and nonyl groups and $R^3$ is selected from the group consisting of methylene, thio, butylidene and methylethylidene.

It is a further object of the invention to provide an acoustic damping composition in which at least one of $R^1$, $R^2$, $R^4$, and $R^5$ comprises a $C_4$ to $C_{12}$ alkyl group, and is located at a 2 or 6 position on at least one ring of the sterically hindered phenol compound. It is a further object of the invention to provide an acoustic damping composition in which the $C_4$ to $C_{12}$ alkyl group is located at a 2 or 6 position on at least one of the rings of the bisphenol compound, i.e. the $C_4$ to $C_{12}$ alkyl substituent is adjacent to an OH substituent on a phenolic ring. It is a yet further object of the invention to provide an acoustic damping composition wherein the $C_4$ to $C_{12}$ alkyl group is a tert-alkyl group.

It is an object of the invention to provide an acoustic damping composition in which the sterically hindered phenol is selected from the group consisting of 2,2'-methylene-bis-(4-methyl-6-tert-butyphenol), 4,4'-thiobis(2-tert-butyl-5-methylphenol), 4,4'-thiobis-6-(t-butyl-m-cresol), 4,4'-butylidene-bis(6-t-butyl-m-cresol), 4,4'-(1-methylethyl-idene)bis[2-(1,1-dimethylethyl) phenol, 2,2'-methylenebis(4-methyl-6-nonyl) phenol, 2,2'-methylene-bis(6-tert-butyl-4-methylphenol), 2,2'-thiobis(4-methy-6-tert-butyl phenol), and 4,4'-thiobis(2-tert-butyl-5-methylphenol).

It is also an object of the invention to provide an acoustic damping composition comprising
(A) at least one liquid elastomer,
(B) a vulcanization agent, and
(C) 5 to 25 wt % of a sterically hindered bisphenol having a melting point in a range from 60° C. to 250° C., wherein adjacent to at least one ring member having an OH substituent said sterically hindered bisphenol comprises a second ring member having a tert-alkyl substituent.

DETAILED DESCRIPTION OF THE INVENTION

Within this specification and the claims, a sterically hindered phenol means a phenolic compound with substituents on the phenolic ring large enough to prevent or retard reaction of the hydroxyl group, as compared to a similar phenolic ring in the absence of the substituents.

In various embodiments, the sterically hindered phenolic compounds will be bisphenol compounds and will have a structure corresponding to Formula I:

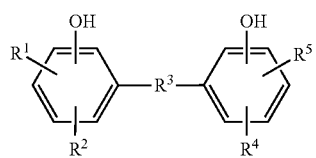

in which $R^1$, $R^2$, $R^4$, and $R^5$, independently of each other, are a $C_1$ to $C_{12}$ alkyl group, and $R^3$ is a hydrocarbon group or a thio group. In some embodiments, $R^1$, $R^2$, $R^4$, and $R^5$ are independently selected from the group consisting of methyl, ethyl, n-butyl, tert-butyl and nonyl groups. In some embodiments $R^3$ is selected from the group consisting of methylene, thio, butylidene and methylethylidene. In some embodiments, at least one of $R^1$, $R^2$, $R^4$, and $R^5$ comprises a $C_4$ to $C_{12}$ alkyl group, desirably a tert-alkyl group, and is located at a 2 or 6 position on at least one of the rings of the bisphenol compound, i.e., the $C_4$ to $C_{12}$ alkyl substituent is adjacent to an OH substituent on a phenolic ring.

Exemplary compounds include 2,2'-methylene-bis-(4-methyl-6-tert-butyphenol), 4,4'-thiobis(2-tert-butyl-5-methylphenol), 4,4'-thiobis-6-(tert-butyl-m-cresol), 4,4'-butyl-idene-bis(6-tert-butyl-m-cresol), 4,4'-(1-methylethyl-idene)bis[2-(1,1-dimethylethyl) phenol, and 2,2'-methylenebis(4-methyl-6-nonyl) phenol. Further exemplary compounds include 2,2'-methylene-bis(6-tert-butyl-4-methylphenol) with a melting range from 127° C. to 129° C.; 2,2'-thiobis(4-methy-6-tert-butyl phenol) with a melting range from 83° C. to 85° C.; and 4,4'-thiobis(2-tert-butyl-5-methylphenol) with a melting range from 160° C. to 164° C.

Favorable damping performance is obtained from acoustic damping compositions comprising synthetic rubbers in the vulcanized state when those compositions are enhanced by an amount of a sterically hindered phenolic compound ranging from 9% to 18% by weight of the total composition. This amount can be any amount or range of amounts within that range. In various embodiments, the lower limit of this range can be from 9 wt % to 15 wt %, 10 wt % to 14 wt %, 11 wt % to 13 wt %, or 12 wt % to 15 wt %; the upper limit of this range can be from 18 wt % to 12 wt %, from 17 wt % to 13 wt %, or 16 wt % to 14 wt %.

In various embodiments the melting point range for the sterically hindered phenols will be any temperature or range of temperatures from 60° C. to 250° C. In various embodiments, the lower limit of this range can be 60° C. to 240° C., 70° C. to 230° C., 80° C. to 220° C., 90° C. to 210° C., 100° C. to 200° C., 90° C. to 190° C., 100° C. to 180° C., 110° C. to 170° C., 120° C. to 160° C., 130° C. to 150° C., or 135° C. to 145° C.; the upper limit of this range can be 250° C. to 70° C., 240° C. to 80° C., 230° C. to 90° C., 220° C. to 100° C., 210° C. to 110° C., 200° C. to 120° C., 190° C. to 130° C., 180° C. to 140° C., 170° C. to 150° C., or 165° C. to 160° C.

Another suitable component found to enhance damping properties for the composition is acicular crystalline hydrated magnesium alumino-silicate. In some embodiments, the damping enhancing agent will include the combination of a hindered phenolic compound and an acicular crystalline hydrated magnesium alumino-silicate.

When present, the total damping enhancing agent will be in an amount from 3 wt % to 30 wt % of the total composition. In another embodiment, the total damping enhancing agent will be present in an amount from 5 wt % to 20 wt % of the total composition.

Suitable elastomers are liquid and have olefinic double bonds. Examples include non-functionalized polybutadiene, in particular the 1,4- and 1,2- polybutadienes; polyisobutylenes; butadiene-styrene copolymers; and butadiene-acrylonitrile copolymers. In some embodiments, these elastomers are functionalized with hydroxyl, carboxyl, carboxylic acid anhydride, and/or epoxy groups. A preferred functionality is the carboxyl group. Combinations of non-functionalized and functionalized elastomers can be used. A preferred weight ratio of non-functionalized to functionalized elastomers ranges from 5:1 to 4:1. The weight average molecular weight of these liquid polymers is typically 20,000 or less; in another embodiment, the weight average molecular weight can be any weight or weight range from 900 to 10,000. In a further embodiment, styrene butadiene copolymers having a weight average molecular weight of 60,000 or less may also be added to the composition.

The proportions of liquid rubber in the entire composition depends on the desired rheology of the uncured composition and the desired mechanical and acoustic damping properties of the cured composition. Usually, the greater the amount of liquid rubber present, the more viscous the composition will be, but also the greater the damping properties. The proportion of liquid rubber or elastomer normally varies within the range from 5 wt % to 50 wt % of the total composition, and can be any weight percent or range of weight percents within that range. In various embodiments, the lower limit of this range can be any weight percent from 5 wt % to 45 wt %, 10 wt % to 40 wt %, 15 wt % to 35 wt %, or 20 wt % to 30 wt %; the upper limit of the range can be any weight percent from 50 wt % to 10 wt %, 45 wt % to 15 wt %, 40 wt % to 20 wt %, or 35 wt % to 25 wt %.

A suitable vulcanization agent is a combination of i) sulfur powder, ii) organic accelerators, and iii) metal oxide. Suitable organic accelerators include mercapto-benzothiazole, dithiocarbamate, dibenzothiazole disulfide, sulfenamide, and thiuram disulfide. Suitable metal oxides are zinc oxide and calcium oxide, although other metal oxides also work as accelerators. The sulfur powder content will be present in any amount or ranges of amounts from 3 wt % to 15 wt %. In various embodiments, the lower limit of the sulfur powder content will range from 3 wt % to 14 wt %, 4 wt % to 13 wt %, 5 wt % to 12 wt %, 6 wt % to 11 wt %, 7 wt % to 10 wt %, or from 8 wt % to 9 wt %; the upper limit of the sulfur powder content will range from 15 wt % to 4 wt%, 14wt % to 5 wt %, 13 wt % to 6 wt %, 12 wt % to 7 wt %, 11 wt % to 8 wt %, or 10 wt % to 9 wt %. The total vulcanization agent will be present in the composition in any amount or ranges of amounts from 5 wt % to 20 wt %. In various embodiments, the lower limit of the total vulcanization agent will range from 5 wt % to 18 wt %, 7 wt % to 18 wt %, 9 wt % to 16 wt %, 11 wt % to 14 wt %; the upper limit of the total vulcanization agent will range from 20 wt % to 7 wt %, 18 wt % to 9 wt %, 16 wt % to 11 wt %, or 14 wt % to 13 wt %.

Suitable fillers can be selected from a plurality of materials, and particularly from ground or precipitated calcium carbonates. Other suitable fillers include flaky materials, such as mica, talc, and graphite. If graphite is used as a filler, a suitable particle size is from 30 to 300 microns, or from 40 to 150 microns. Other suitable fillers include hollow glass microspheres, hollow expandable plastic microspheres based on polyvinylidene chloride copolymers or acrylonitrile copolymers, and expandable graphites. Fillers will be present in the composition in any amount or ranges of amounts between 35 wt % to 60 wt % of the total composition. In various embodiments, the lower limit of this range will be from 35 wt % to 55 wt %, or 40 wt % to 50 wt %; the upper limit of this range will be from 60 wt % to 40 wt %, or 55 wt % to 45 wt %.

In some embodiments, the composition will also comprise an extender oil. Suitable extender oils include castor oil, rapeseed oil, and soybean oil. Typically, extender oils will be in the composition in any amount or range of amounts from 3 wt % to 20 wt % of the total composition. In various embodiments, the lower limit of this range will be from 3 wt % to 18 wt %, 7 wt % to 14 wt % or 10 wt % to 12 wt %; the upper limit of this range will be from 20 wt % to 5 wt %, 18 wt % to 7 wt %, or 15 wt % to 11 wt %.

In further embodiments, the composition may also include one or more expansion agents, theology thickeners, or combinations of any of those. A suitable theology thickener is fumed silica, although other rheology thickeners known in the art may be used. A suitable physical blowing agent is that sold under the tradename EXPANCEL 092-DU-120.

EXAMPLES

For purposes of this invention, "acoustically effective damping" or "vibration damping" is deemed to be solid-borne sound damping that brings about a diminution in the drumming sound arising from the vibration of sheet-metal structures.

The acoustic damping properties of the inventive and comparative compositions in the examples were measured for composite loss factors according to the Society of Automotive Engineering test method SAE J1637 (OBERST METHOD). Composite loss factors show ability to reduce structurally borne sound and represent how much vibration-related energy a particular material absorbs at a given temperature. Loss factors are measured as test temperatures vary from −20° C. to 60° C.; they are lower at the lower temperatures, increase to a maximum at a specific temperature, and then decrease, the measurements creating a bell shaped profile. Loss factors are based on a linear scale of 0 to 1, with 0 being an undamped steel panel and 1 being a theoretically perfectly damped steel panel (no vibration). The higher the maximum composite loss factor (from the bell shaped profile), the more effective the material is in damping sound. In the following tables, the composite loss factor is referred to as loss factor, with the maximum value recorded.

The test vehicles were steel panels coated with cured compositions according to the present invention or with comparative compositions. The compositions were mixed in a FlackTek speedmixer until they were a homogeneous paste. Unless otherwise indicated, all compositions were prepared at room temperature. After mixing, the compositions were de-aired, coated on the steel panels, and cured. Composite loss factors were measured and computed at Mode 3 resonant frequency from temperatures between −20° C. and 60° C.

Table 1 records the components and properties of comparative samples in which the reaction product of 4-methylphenol with dicyclopentadiene and isobutylene is used as an enhancing agent. This reaction product has a molecular weight of approximately 650 g/mole. The data show that this compound, present in amounts from 0.5 wt % to 25 wt %, gives loss factors between 0.101 and 0.130, with the lowest loss factors, meaning worse performance, being at 9.00 and 18.00 wt % of hindered phenol.

TABLE 1

COMPARATIVE EXAMPLES

| Component Description | COMPONENT AMOUNTS IN WEIGHT PERCENT | | | | |
|---|---|---|---|---|---|
| | Ex A | Ex B | Ex C | Ex D | Ex E |
| ELASTOMERIC POLYMERS | | | | | |
| polybutadiene MW 1000 | 15.57 | 18.00 | 18.00 | 18.00 | 18.00 |
| polybutadiene with active carbonyl group MW 1700 | 3.00 | 4.00 | 4.00 | 4.00 | 4.00 |
| VULCANIZATION AGENT | | | | | |
| Sulfur | 5.50 | 9.90 | 9.90 | 9.90 | 9.90 |
| zinc dibenzyl dithiocarbamate | 0.75 | 0.44 | 0.44 | 0.44 | 0.44 |

TABLE 1-continued

COMPARATIVE EXAMPLES

| | COMPONENT AMOUNTS IN WEIGHT PERCENT | | | | |
|---|---|---|---|---|---|
| Component Description | Ex A | Ex B | Ex C | Ex D | Ex E |
| zinc 2-mercapto benzothiazole | 0.50 | 1.50 | 1.50 | 1.50 | 1.50 |
| zinc oxide | 0.19 | 0.20 | 0.20 | 0.20 | 0.20 |
| Calcium oxide | 2.00 | 2.00 | 2.00 | 2.00 | 2.00 |
| HINDERED PHENOLS | | | | | |
| 4-methylphenol reaction product with dicyclopentadiene and isobutylene | 0.50 | 5.00 | 9.00 | 18.00 | 25.00 |
| FILLERS | | | | | |
| Calcium carbonate | 13.85 | 20.58 | 20.58 | 20.58 | 13.58 |
| calcium carbonate coated with stearate | 20.74 | 0.00 | 0.00 | 0.00 | 0.00 |
| graphite | 15.00 | 28.00 | 24.00 | 15.00 | 15.00 |
| hollow glass spheres | 2.00 | 1.00 | 1.00 | 1.00 | 1.00 |
| EXTENDER OIL | | | | | |
| soybean oil | 18.50 | 8.88 | 8.88 | 8.88 | 8.88 |
| ADDITIVES | | | | | |
| fumed silica expansion agent | 1.70 | 0.50 | 0.50 | 0.50 | 0.50 |
| MAXIMUM LOSS FACTOR | 0.105 | 0.130 | 0.101 | 0.104 | 0.121 |
| TEMPERATURE ° C. AT MAXIMUM LOSS FACTOR | 10.3 | 30.0 | 30.0 | 30.0 | 30.0 |

Table 2 records the components and properties of samples in which the enhancing agent is the hindered phenol 2,2-methylene-bis-(4 methyl-6-tert-butylphenol). The data show that the highest loss factors, 0.156 and 0.185 are achieved when the amount of hindered phenol is at 9.9 wt % and 18.02 wt %. Lower loss factors are obtained at 5 wt % and 25 wt %, indicating that there is an optimum range for the level of hindered phenol in a composition to obtain the highest loss factors for that composition.

TABLE 2

EXAMPLES

| | COMPONENT AMOUNTS IN WEIGHT PERCENT | | | |
|---|---|---|---|---|
| Component Description | Ex 1 | Ex 2 | Ex 3 | Ex 4 |
| ELASTOMERIC POLYMERS | | | | |
| polybutadiene MW 1000 | 18.00 | 17.79 | 16.21 | 18.00 |
| polybutadiene with carbonyl group MW 1700 | 4.00 | 3.96 | 3.60 | 4.00 |
| VULCANIZATION AGENT | | | | |
| Sulfur | 9.90 | 9.90 | 9.01 | 9.90 |
| Zinc dibenzyl dithiocarbamate | 0.44 | 0.44 | 0.40 | 0.44 |
| Zinc 2-mercapto benzothiazole | 1.50 | 1.49 | 1.35 | 1.50 |
| Zinc oxide | 0.20 | 0.20 | 0.18 | 0.20 |
| Calcium oxide | 2.00 | 1.98 | 1.80 | 2.00 |
| HINDERED PHENOLS | | | | |
| 2,2-methylene-bis-(4 methyl-6-tert-butylphenol) | 5.00 | 9.90 | 18.02 | 25.00 |
| FILLERS | | | | |
| Calcium carbonate | 20.58 | 14.85 | 13.50 | 13.58 |
| graphite | 28.00 | 29.70 | 27.03 | 15.00 |
| hollow glass spheres | 1.00 | 1.00 | 0.90 | 1.00 |
| EXTENDER OIL | | | | |
| soybean oil | 8.88 | 8.79 | 8.00 | 8.88 |
| ADDITIVES | | | | |
| fumed silica | 0.50 | 0.00 | 0.00 | 0.50 |
| MAXIMUM LOSS FACTOR | 0.125 | 0.156 | 0.185 | 0.121 |
| TEMPERATURE ° C. AT MAXIMUM LOSS FACTOR | 25.0 | 26.0 | 20.1 | 30.0 |

Table 3 records the components and properties of samples in which the enhancing agents are the hindered phenols 4,4'-thiobis(2-tert-butyl-5-methylphenol) and 2,2'-thiobis(4-methy-6-tert-butyl phenol). The data show that the highest loss factors are achieved when the amount of hindered phenol is present between about 9 wt % to about 18 wt %. Lower loss factors are obtained outside this range at 5 wt % and 25 wt %, indicating that there is an optimum range for the level of hindered phenol in a composition to obtain the highest loss factor for that composition.

TABLE 3

EXAMPLES

| COMPONENT DESCRIPTION | COMPONENT AMOUNTS IN WEIGHT PERCENT | | | | | | | |
|---|---|---|---|---|---|---|---|---|
| | Ex 5 | Ex 6 | Ex 7 | Ex 8 | Ex 9 | Ex 10 | Ex 11 | Ex 12 |
| ELASTOMERIC POLYMERS | | | | | | | | |
| polybutadiene MW 1000 | 18.00 | 16.12 | 16.12 | 18.00 | 18.00 | 16.12 | 16.12 | 18.00 |
| polybutadiene with carbonyl group MW 1700 | 4.00 | 3.59 | 3.59 | 4.00 | 4.00 | 3.59 | 3.59 | 4.00 |
| VULCANIZATION AGENT | | | | | | | | |
| Sulfur | 9.90 | 8.97 | 8.97 | 9.90 | 9.90 | 8.97 | 8.97 | 9.90 |
| zinc dibenzyl dithiocarbamate | 0.44 | 0.40 | 0.40 | 0.44 | 0.44 | 0.40 | 0.40 | 0.44 |
| zinc 2-mercapto benzothiazole | 1.50 | 1.35 | 1.35 | 1.50 | 1.50 | 1.35 | 1.35 | 1.50 |
| zinc oxide | 0.20 | 0.18 | 0.18 | 0.20 | 0.20 | 0.18 | 0.18 | 0.20 |
| Calcium oxide | 2.00 | 1.79 | 1.79 | 2.00 | 2.00 | 1.79 | 1.79 | 2.00 |
| HINDERED PHENOLS | | | | | | | | |
| 4,4'-thiobis(2-tert-butyl-5-methyl-phenol) | 5.00 | 9.00 | 17.94 | 25.00 | 0.00 | 0.00 | 0.00 | 0.00 |
| 2,2'-thiobis(4-methyl-6-tert-butyl phenol) | 0.00 | 0.00 | 0.00 | 0.00 | 5.00 | 9.00 | 17.94 | 25.00 |
| FILLERS | | | | | | | | |
| Calcium carbonate | 20.58 | 20.94 | 13.45 | 13.58 | 20.58 | 20.94 | 13.45 | 13.58 |
| graphite | 28.00 | 28.40 | 26.90 | 15.00 | 28.00 | 28.40 | 26.90 | 15.00 |
| hollow glass spheres | 1.00 | 0.90 | 0.90 | 1.00 | 1.00 | 0.90 | 0.90 | 1.00 |
| EXTENDER OIL | | | | | | | | |
| soybean oil | 8.88 | 7.96 | 7.96 | 8.88 | 8.88 | 7.96 | 7.96 | 8.88 |
| ADDITIVES | | | | | | | | |
| fumed silica | 0.50 | 0.45 | 0.45 | 0.50 | 0.50 | 0.45 | 0.45 | 0.50 |
| MAXIMUM LOSS FACTOR | 0.137 | 0.150 | 0.258 | 0.106 | 0.122 | 0.135 | 0.152 | 0.130 |
| TEMPERATURE ° C. AT MAXIMUM LOSS FACTOR | 35.0 | 40.0 | 39.9 | 40.0 | 25.0 | 30.0 | 12.3 | 15.0 |

It was also discovered that as the temperature of the melting range of hindered phenolic compound increased, the composite loss factor of the sound damping compound increased unexpectedly. These findings are summarized in Table 4.

TABLE 4

| HINDERED PHENOL | MELTING RANGE | COMPOSITE LOSS FACTOR |
|---|---|---|
| 2,2'-thiobis(4-methy-6-tert-butyl phenol) | 83-85° C. | 0.152 |
| 2,2'-methylenebis(6-tert-butyl-4-methyl-phenol) | 127-129° C. | 0.185 |
| 4,4'-thiobis(2-tert-butyl-5-methylphenol) | 160-164° C. | 0.258 |

What is claimed is:

1. An acoustic damping composition comprising
(A) one or more liquid natural or synthetic rubber elastomeric polymers, wherein said one or more liquid natural or synthetic rubber elastomeric polymers are present in an amount of from 5 weight % to 50 weight % based on a total weight of said composition,
(B) a vulcanization agent, said vulcanization agent being the sole curing agent in said composition and curing said composition, and
(C) 9 to 18 wt %, based on the total composition weight, of a sterically hindered phenol having a melting point in a range from 60° C. to 250° C., a molecular weight of 300 g/mol or less, and said sterically hindered phenol having a structure corresponding to Formula (I)

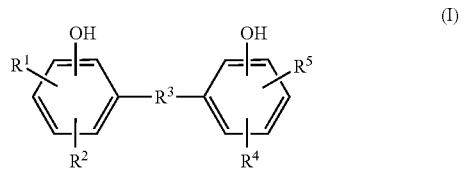

in which $R^1$, $R^2$, $R^4$, and $R^5$, independently of each other, are a $C_1$ to $C_{12}$ alkyl group, and $R^3$ is a hydrocarbon group or a thio group; and
wherein said composition when cured exhibits a composite loss factor computed at Mode 3 resonant frequency from temperatures of from −20° C. to 60° C. of at least 0.135 according to test method SAE J1637, Oberst method.

2. The acoustic damping composition of claim 1 in which $R^1$, $R^2$, $R^4$, and $R^5$ are independently selected from the group consisting of methyl, ethyl, n-butyl, tert-butyl and nonyl groups and $R^3$ is selected from the group consisting of methylene, thio, butylidene and methylethylidene.

3. The acoustic damping composition of claim 1 in which the sterically hindered phenol is selected from the group consisting of 2,2'-methylene-bis-(4-methyl-6-tert-butyphenol), 4,4'-thiobis(2-tert-butyl-5-methylphenol), 4,4'-thiobis-6-(t-butyl-m-cresol), 4,4'-butylidene-bis(6-t-butyl-m-cresol), 4,4'-(1-methylethyl-idene)bis[2-(1,1-dimethylethyl)phenol, 2,2'-methylenebis(4-methyl-6-nonyl) phenol, 2,2'-methylene-bis(6-tert-butyl-4-methylphenol), and 2,2'-thio-bis(4- methyl-6-tert-butyl phenol).

4. The acoustic damping composition of claim 1 in which the one or more liquid natural or synthetic rubber elastomeric polymers are selected from the group consisting of polybutadienes, functionalized polybutadienes, polyisobutylenes, functionalized polyisobutylenes, butadiene-acrylonitrile copolymers, functionalized butadiene-acrylonitrile copolymers, functionalized styrene-butadiene copolymers, styrene butadiene copolymers, and mixtures thereof; and wherein said polybutadienes, polyisobutylenes, butadiene-acrylonitrile copolymers and styrene-butadiene copolymers are functionalized with a functional group selected from the group consisting of a hydroxyl, a carboxyl, a carboxylic acid anhydride, an epoxy, and mixtures thereof.

5. The acoustic damping composition of claim 1 in which the vulcanization agent is prepared from i) sulfur powder, ii) organic accelerator, and iii) metal oxide.

6. The acoustic damping composition of claim 1 in which at least one of $R^1$, $R^2$, $R^4$, and $R^5$ comprises a $C_4$ to $C_{12}$ alkyl group, and is located at a 2 or 6 position on at least one ring of the sterically hindered phenol compound.

7. The acoustic damping composition of claim 6 wherein the $C_4$ to $C_{12}$ alkyl group is a tert-alkyl group.

8. An acoustic damping composition comprising
(A) one or more liquid natural or synthetic rubber elastomeric polymers wherein said one or more liquid natural or synthetic rubber elastomeric polymers are present in an amount of from 5 weight % to 50 weight % based on a total weight of said composition,
(B) a vulcanization agent, said vulcanization agent being the sole curing agent in said composition and curing said composition, and
(C) 5 to 25 wt % of a sterically hindered bisphenol having a melting point in a range from 60° C. to 250° C., a molecular weight of 300 g/mol or less and wherein adjacent to at least one ring member having an OH substituent said sterically hindered bisphenol comprises a second ring member having a tert-alkyl substituent; and
wherein said composition when cured exhibits a composite loss factor computed at Mode 3 resonant frequency from temperatures of from −20° to 60° C. of at least 0.135 according to test method SAE J1637, Oberst method.

9. Use of an acoustic damping composition according to claim 1 to reduce structurally borne sound comprising applying the acoustic damping composition to an article to form a coating and vulcanizing the acoustic damping composition to form a cured coating.

10. A method of reducing structurally borne sound of an article of manufacture comprising:
spraying a low viscosity liquid polybutadiene sound damping composition containing a sulfur vulcanization agent according to claim 1 onto the article of manufacture; and
vulcanizing the composition to thereby form a cured coating.

11. An article of manufacture comprising a coating of a composition according to claim 1 said coating being in a vulcanized state and providing a composite loss factors measured and computed at Mode 3 resonant frequency from temperatures between −20° C. and 60° C. of at least 0.135.

12. The acoustic dampening composition of claim 4 wherein when both are present the weight ratio of non-functionalized polymers to functionalized polymers is from 5:1 to 4:1.

13. The acoustic dampening composition of claim 1 further comprising one or more of an acicular crystalline hydrated magnesium alumino-silicate, a filler, an extender oil, an expansion agent, a rheology thickener, or a mixture thereof.

14. The acoustic dampening composition of claim 1 further comprising a source of silicon selected from the group consisting of acicular crystalline hydrated magnesium alumino-silicate, fumed silica, hollow glass spheres, and combinations thereof.

15. The acoustic dampening composition of claim 1 wherein the composition contains fillers selected from the group consisting of calcium carbonates, mica, talc, graphite, hollow glass microspheres, hollow expandable plastic microspheres based on polyvinylidene chloride copolymers or acrylonitrile copolymers, and combinations thereof.

* * * * *

UNITED STATES PATENT AND TRADEMARK OFFICE
CERTIFICATE OF CORRECTION

PATENT NO. : 10,008,195 B2
APPLICATION NO. : 14/767041
DATED : June 26, 2018
INVENTOR(S) : Jeng-Li Liang, Michael S. Puckett and Gregory A. Ferguson It is certified that error appears in the above-identified patent and that said Letters Patent is hereby corrected as shown below:

In the Specification

Column 5, Line 49, change "theology" to --rheology--

Column 5, Line 50, change "theology" to --rheology--

Signed and Sealed this
Fifth Day of March, 2019

Andrei Iancu
*Director of the United States Patent and Trademark Office*